US012575582B2

(12) United States Patent
Glenn, III et al.

(10) Patent No.: US 12,575,582 B2
(45) Date of Patent: *Mar. 17, 2026

---

(54) PRODUCT AND METHOD OF PRODUCING DAIRY PRODUCTS COMPRISING DAIRY-DERIVED EMULSIFYING SALTS

(71) Applicant: Land O'Lakes, Inc., Arden Hills, MN (US)

(72) Inventors: Thomas Alexander Glenn, III, Shoreview, MN (US); Richard Dinesen, Woodbury, MN (US)

(73) Assignee: Land O'Lakes, Inc., Arden Hills, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/589,187

(22) Filed: Feb. 27, 2024

(65) Prior Publication Data

US 2024/0196915 A1 Jun. 20, 2024

Related U.S. Application Data

(63) Continuation of application No. 17/725,789, filed on Apr. 21, 2022, now Pat. No. 11,950,605, which is a (Continued)

(51) Int. Cl.
*A23C 19/08* (2006.01)

(52) U.S. Cl.
CPC ........ *A23C 19/08* (2013.01); *A23C 2210/206* (2013.01); *A23C 2250/054* (2013.01); (Continued)

(58) Field of Classification Search
CPC ....... A23C 19/082; A23C 9/1425; A23C 9/15; A23C 9/144; A23C 9/1422; A23C 19/08; (Continued)

(56) References Cited

U.S. PATENT DOCUMENTS

| | | | |
|---|---|---|---|
| 4,497,836 A | 2/1985 | Marquardt et al. |
| 4,855,056 A | 8/1989 | Harju et al. |
| | (Continued) | | |

FOREIGN PATENT DOCUMENTS

| | | |
|---|---|---|
| EP | 0016292 A1 | 10/1980 |
| EP | 0835610 B1 | 12/2004 |
| | (Continued) | |

OTHER PUBLICATIONS

Glanbia Nutritionals, "TruCal for Healthy Bones", https://www.glanbianutritionals.com/en/news-insights/media/trucal-healthy-bones, Apr. 14, 2017, 3 pages.

*Primary Examiner* — Subbalakshmi Prakash

(74) *Attorney, Agent, or Firm* — Dorsey & Whitney LLP

(57) ABSTRACT

Dairy products are produced by subjecting a starting dairy material to nanofiltration to remove monovalent ions to produce an ion-depleted dairy permeate; passing the ion-depleted dairy permeate through an ion exchange column and subsequently with a sodium-containing eluting solution to produce sodium phosphate and sodium citrate derived from the starting material; concentrating the sodium phosphate and sodium citrate; and combining the concentrated sodium phosphate and sodium citrate with dairy components. The dairy product contains an amount of the concentrated sodium phosphate and sodium citrate sufficient to cause fat in the dairy product to be emulsified and protein in the dairy product to be hydrated. In addition or alternatively, a dairy by-product stream may be subjected to ion exchange to remove calcium therefrom; concentrated, and combined with dairy materials naturally containing phosphate and citrate in order to adjust the citrate+phosphate-to-calcium ratio to reach an emulsified dairy product.

20 Claims, 2 Drawing Sheets

Related U.S. Application Data continuation of application No. 16/382,915, filed on Apr. 12, 2019, now Pat. No. 11,337,435.

(52) U.S. Cl.
CPC ..... *A23V 2002/00* (2013.01); *A23V 2200/222* (2013.01); *A23V 2250/032* (2013.01); *A23V 2250/046* (2013.01); *A23V 2250/1614* (2013.01); *A23V 2300/34* (2013.01)

(58) Field of Classification Search
CPC .............. A23C 9/146; A23C 2210/206; A23C 2250/054; A23V 2300/34; A23V 2250/046; A23V 2200/222; A23V 2250/1614; A23V 2250/032; A23V 2002/00
USPC ........................................................ 426/582
See application file for complete search history.

(56) References Cited

U.S. PATENT DOCUMENTS

| | | | |
|---|---|---|---|
| 6,033,700 | A | 3/2000 | Berrocal et al. |
| 6,475,390 | B1 | 11/2002 | Durham et al. |
| 2003/0054068 | A1 | 3/2003 | Dybing et al. |
| 2008/0193623 | A1 | 8/2008 | Guerra-Gonzalez et al. |
| 2009/0092730 | A1 | 4/2009 | Smith et al. |
| 2012/0121781 | A1 | 5/2012 | Scott et al. |
| 2012/0263839 | A1 | 10/2012 | Seki et al. |
| 2022/0240530 | A1 | 8/2022 | Glenn et al. |

FOREIGN PATENT DOCUMENTS

| | | | |
|---|---|---|---|
| EP | 2415349 | B1 | 5/2013 |
| ES | 2423999 | T3 | 9/2013 |
| JP | 5771520 | B2 | 9/2015 |
| RU | 2192749 | C2 | 11/2002 |
| RU | 2192751 | C2 | 11/2002 |
| WO | 2011037154 | A1 | 3/2011 |

100

110 — Filter Starting Material

120 — Filter permeate containing native phosphate and citrate

130 — Subject the ion-depleted permeate to ion exchange

140 — Concentrate the retentate containing the dairy-derived sodium phosphate and sodium citrate 150 — Combine 160 — Ferment 170 — Pasteurization

200

210

Ion exchange

220

Concentrate

230

Combine

PRODUCT AND METHOD OF PRODUCING DAIRY PRODUCTS COMPRISING DAIRY-DERIVED EMULSIFYING SALTS

CROSS REFERENCE TO RELATED APPLICATIONS

This application is a continuation of U.S. patent application Ser. No. 17/725,789, filed Apr. 21, 2022, issued as U.S. Pat. No. 11,950,605 on Apr. 9, 2024 entitled "PRODUCT AND METHOD OF PRODUCING DAIRY PRODUCTS COMPRISING DAIRY-DERIVED EMULSIFYING SALTS", which is a continuation of U.S. patent application Ser. No. 16/382,915, filed Apr. 12, 2019, issued as U.S. Pat. No. 11,337,435 on May 24, 2022 having the same title, each of which is incorporated by reference herein, in its entirety and for all purposes.

TECHNICAL FIELD

The present disclosure relates to dairy products containing dairy-derived emulsifying salts, such as cheese or cheese-related products, and systems and methods for their manufacture.

BACKGROUND

In traditional manufacturing of pasteurized process cheese, emulsifying salt chemicals like sodium phosphate and sodium citrate are added to natural cheese, and/or to blends of natural cheese and other dairy ingredients and pasteurized to transform these dairy mixtures into a molten homogenous process cheese that is cooled and packaged. Phosphate based emulsifying salts are produced from raw materials such as rocks, ore, and other mineral deposits derived from mines containing minerals, e.g., phosphate, in which the mineral is extracted therefrom using industrial chemical processing approaches and converted to a mineral-containing emulsifying salts, e.g., sodium phosphate. The added sodium phosphate emulsifying salt in process cheese aids the transformation into a molten homogenous process cheese through two aspects. First, a portion of the unbound phosphate within the sodium and phosphate equilibrium disrupts the dynamic equilibrium between bound and free calcium in the matrix by binding free calcium in the environment, causing a redistribution of protein bound calcium out and into the unbound environment liberating protein to emulsify the milk fat within the matrix. Second, due to the weak acid nature of phosphate, a disruption in the pH equilibrium in the matrix occurs where free phosphate binds free hydrogen ions in the matrix thus raising the pH and causing de-protonation of acidic functional groups on casein like aspartic and glutamic acid. This effectively hydrates the protein via solvated sodium ions exchange on the aspartic and glutamic acid residues on the protein from the sodium phosphate, or otherwise solvated free sodium in the environment.

SUMMARY

According to the present disclosure, by utilizing the phosphate and citrate naturally present in milk, one could leverage the phosphate and citrate chemistry necessary to manufacture a process cheese without the additional emulsifying salt chemicals. Accordingly, implementations are directed to dairy-derived emulsifying salts and dairy products containing these dairy-derived emulsifying agents, and systems and methods for their production.

Implementations accordingly provide methods for producing a dairy product involving adjusting a phosphate+citrate-to-calcium ratio of a starting dairy material by:demineralizing the starting dairy material to remove at least one of chloride ($Cl^-$) or calcium ($Ca^+$), by for instance subjecting the starting dairy material to ion exchange to produce a mineral-depleted dairy material; concentrating the mineral-depleted dairy material; and combining the concentrated mineral-depleted dairy material with dairy components to produce the dairy product. Due to the presence of phosphate and citrate native to one or both of the concentrated mineral-depleted dairy material and the dairy components in the dairy product, the dairy product contains an amount of native phosphate and citrate sufficient to emulsify fat and hydrate protein in the dairy product.

In further implementations and alternatives, at least a portion of potassium ($K^+$) and sodium ($Na^+$) present in the starting dairy material are removed, for instance through nanofiltration (NF).

The step of demineralizing may further involve removing at least a portion of potassium ($K^+$) present in the starting dairy material.

The step of concentrating may involve one or more of evaporative heating, spray drying or reverse osmosis or forward osmosis.

Other implementations provide methods for producing a dairy product involving subjecting a dairy by-product stream to ion exchange to remove calcium; concentrating the calcium-depleted by-product stream; and combining the calcium-depleted by-product stream with dairy components to produce the dairy product. In such implementations, the dairy product contains an amount of native phosphate and citrate sufficient to emulsify fat and hydrate protein in the dairy product.

In further implementations and alternatives, the dairy by-product stream is produced by subjecting a starting dairy material to filtration to produce the by-product stream. For instance, the starting material includes one or more of pasteurized milk, milk permeate, whey, whey permeate, acid whey, acid whey permeate.

In further implementations and alternatives, the calcium-depleted by-product stream is calcium-depleted mother liquor from lactose manufacture or calcium-depleted grand-mother liquor from lactose manufacture.

The starting dairy material may be subjected to crystallization to produce the by-product stream. In addition or alternatively, the step of concentrating may involve evaporative heating, spray drying, reverse osmosis or forward osmosis.

Other implementations provide methods for the production of a dairy product that involve: subjecting a starting dairy material to nanofiltration to remove monovalent ions to produce an ion-depleted dairy permeate; passing the ion-depleted dairy permeate through an ion exchange column and subsequently passing a sodium-containing eluting solution through the ion exchange column to produce sodium phosphate and sodium citrate derived from the starting material; concentrating the sodium phosphate and sodium citrate; and combining the concentrated sodium phosphate and sodium citrate with dairy components to produce the dairy product. In such implementations, the dairy product contains an amount of the concentrated sodium phosphate and sodium citrate sufficient to cause fat in the dairy product to be emulsified and protein in the dairy product to be hydrated.

In further implementations and alternatives, the starting dairy material includes pasteurized milk, skim milk, buttermilk, milk permeate, whey, whey permeate, salty whey, acid whey, acid whey permeate, mother liquor from lactose manufacture or grandmother liquor from lactose manufacture.

In further implementations and alternatives, the dairy components comprises a separate dairy source from starting dairy material. The starting dairy material may be produced from one or more of ultrafiltration (UF), microfiltration (MF) or nanofiltration (NF), and for instance may be a permeate produced from the one or more of the UF or MF. For example, the starting dairy material is milk permeate.

In further implementations and alternatives, the dairy components added in the step of combining may include a concentrated milk retentate or a fermented concentrated milk retentate or a component thereof produced from the one or more of the UF or MF.

The ion exchange column may be an anion exchange column and the sodium-containing eluting solution may be a solution of sodium chloride, sodium hydroxide or a mixture thereof. In addition or alternatively, the step of concentrating the sodium phosphate and sodium citrate uses reverse osmosis.

DETAILED DESCRIPTION OF THE EMBODIMENTS

Figure 1:
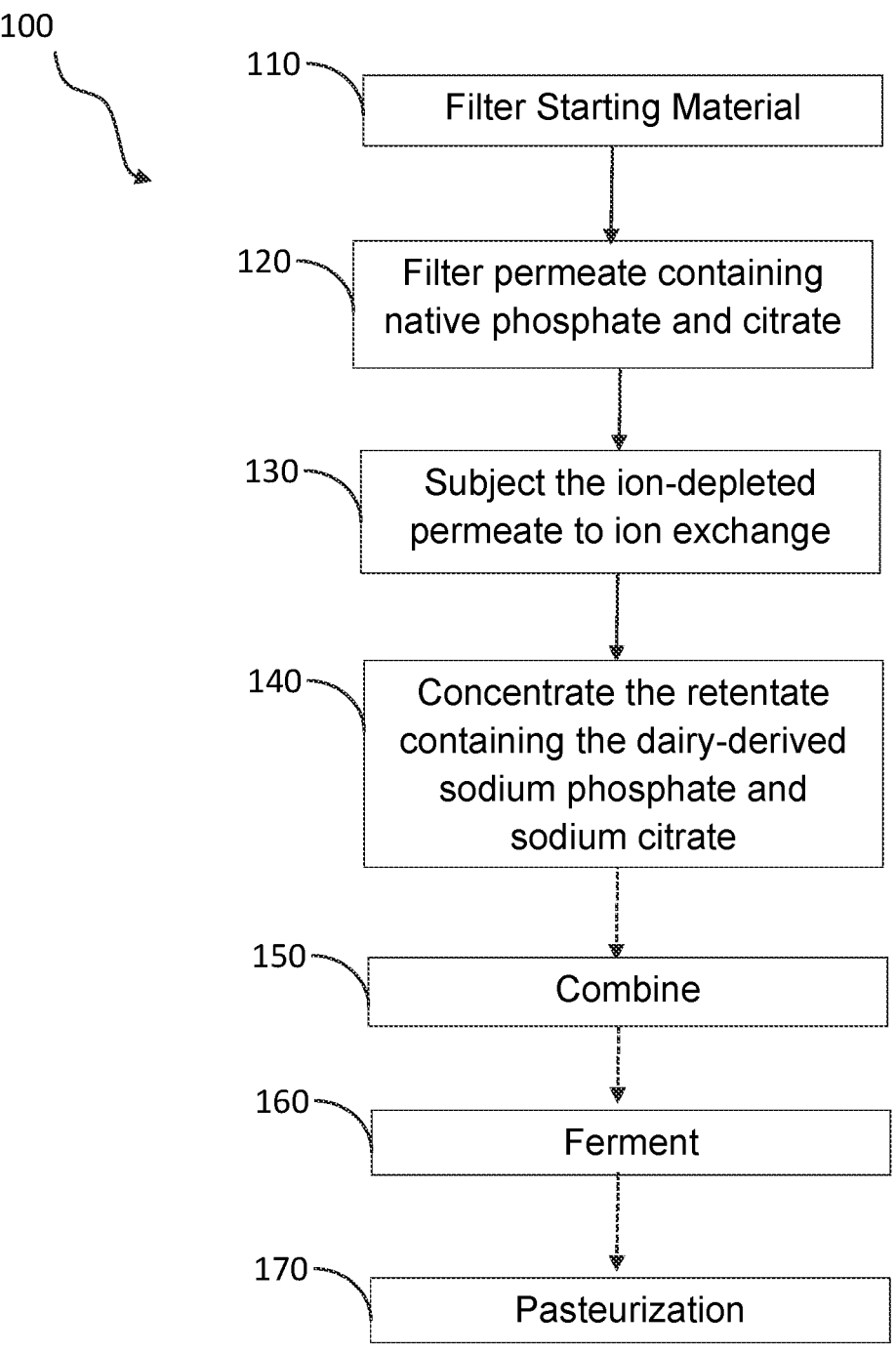
FIG. 1 is a flowchart of a process for the manufacture of a dairy product containing dairy-derived emulsifying salts or agents according to implementations of the present disclosure.

Overview: Implementations are directed to dairy-derived emulsifying salts and dairy products that use such emulsifying salts whereby phosphate and citrate naturally present in milk interact with milk components and are responsible for emulsifying the dairy product. Such products can be manufactured without traditional added sources of emulsifying salts and chemicals, which are derived from mineral deposits (e.g., phosphate-rich mines). Particularly, by utilizing the phosphate and citrate naturally present in milk, phosphate and citrate chemistry necessary to manufacture a dairy product containing emulsifying salts, such as process cheese, can be leveraged without inclusion of additional, non-dairy-derived emulsifying salts. The use of dairy-derived emulsifying salts according to the present disclosure enables the production of dairy products with a cleaner label.

Dairy-derived emulsifying salts may be produced from milk as well as dairy by-product streams that contain orthophosphate and citrate species. Milk may be used as a starting material in the production of dairy-derived emulsifying salts, which naturally contains dairy orthophosphates and citrate. Milk may be whole milk, skim milk, as well as milk concentrates, e.g., cream. Dairy by-products that contain dairy orthophosphates and citrate include but are not limited to: milk permeate, whey, whey permeate, acid whey, acid whey, salty whey, mother liquor from lactose manufacture and grandmother liquor of lactose manufacture. Demineralization of these dairy streams via nanofiltration, ion exchange or electrodialysis may yield either a dairy phosphate and citrate, or a calcium-depleted stream. Admixtures of the emulsifying salt, or calcium-depleted product, with dairy components may enable the admixture to effectively yield a dairy phosphate and citrate enriched product for further processing to be used in manufacturing a dairy product with dairy-derived emulsifying salts. For instance, process cheese may be manufactured by manipulating the phosphate+citrate-to-calcium ratio during the manufacturing process, either by isolating dairy phosphate and citrate directly or by reducing the calcium relative to the phosphate and citrate in a dairy by-product stream.

The processes of the present disclosure may involve separation, microfiltration (MF), ultrafiltration (UF), nanofiltration (NF) of milk and dairy by-products to form permeates and retentates for subsequent processing and partial recombination, as well as fermentation, concentration, pasteurization, cooling and packaging. Chloride, calcium, or potassium-depleted dairy components derived from filtration steps (e.g., MF, UF, NF) or from ion exchange or electrodialysis may provide demineralized precursors to dairy-derived emulsifiers, and may be used to produce dairy-derived emulsifying salts such as sodium phosphate and sodium citrate, and/or may produce calcium-depleted dairy products, either or both of which may be added to the dairy components for the production of dairy products containing native dairy phosphate and citrate in an amount sufficient to emulsify the dairy product. Certain properties of the dairy product can be adjusted by in-line addition of components such as additives (e.g., cultures, acidifiers (e.g., lactic acid) enzymes, as well as dairy powders, milk fat, water, protein (e.g., microfiltration retentate), sugar, cultures, and/or enzymes. Such additions exclude the addition of non-dairy derived emulsifying salts such as added sodium phosphate and sodium citrate.

Detailed Description of the Figures: According to implementations of the present disclosure, a process 100 for the manufacture of a dairy product containing dairy-derived emulsifiers (e.g. phosphate and citrate salts) is provided in FIG. 1. In process 100 and related approaches, the phosphate and citrate are derived from a dairy stream to provide a cleaner label dairy product, with such dairy products including but not limited to process cheese products, dairy creamers, stabilizing agents and other dairy containing food products.

According to process 100, a starting material 101 may be filtered in a filtration step 110. Starting materials 101 may include but are not limited to milk, skim milk, buttermilk, milk permeate, whey, whey permeate, salty whey, acid whey, acid whey permeate, mother liquor from lactose manufacture, and grandmother liquor from lactose manufacture. The filtration step 110 involves subjecting the starting material to UF, MF, or both. The filtration step 110 may be conducted with or without diafiltration, e.g., washing. As a result of the filtration step 110, a concentrated milk-derived retentate and a milk-derived permeate are produced. The milk-derived permeate contains phosphate and citrate native to the dairy source, e.g., dairy-derived phosphate and citrate.

Nanofiltration step 120 involves NF of the milk-derived permeate containing native phosphate and citrate from step 110. NF results in an ion-depleted permeate from which monovalent ions including chloride ions ($Cl^-$), sodium ions ($Na^+$), and potassium ($K^+$) have been removed as a result of NF. Other approaches to removal of ions from the milk-derived permeate may include electrodialysis.

The ion-depleted permeate is a precursor to the dairy-derived emulsifier, e.g., sodium phosphate and sodium citrate emulsifier salts, and in order to produce these salts, the ion-depleted permeate is passed through an ion exchange column in a step 130. For instance, an anion exchange column may be used in step 130 and may receive the ion-depleted permeate and subsequently a sodium chloride (NaCl) eluting solution, which results in a retentate of sodium orthophosphate (e.g., $NaH_2PO_4$, $Na_2HPO_4$, $Na_3PO_4$) and sodium citrate ($NaC_6H_7O_7$, $Na_2C_6H_6O_7$, $Na_3C_6H_5O_7$) derived from the starting material 101 and a permeate with the phosphate and citrate removed. A sodium hydroxide (NaOH) eluting solution may additionally or alternatively be used.

In a concentrating step 140, the retentate containing the dairy-derived sodium phosphate and sodium citrate is concentrated. Concentration may be through reverse osmosis ("RO"), forward osmosis, spray drying, evaporative heating, and so on. For instance, evaporative heating may be conducted using a wiped film evaporator (e.g., Turba Film evaporator), a thin film evaporator, a scraped surface heat exchanger, and so on. In some implementations a spray dryer may be preferred, for instance, as these streams are relatively rich in phosphate and citrate and suitable for production of process cheese. The concentrating step 140 may result in a dairy-derived sodium phosphate and sodium citrate level that ranges from about 1 to about 15 percent total solids, or about 2 to about 11 percent, about 2 to about 10 percent, about 2 to 8 percent, about 2 to 7 percent, about 2 to 5 percent, about 4 to about 12 percent, about 4 to about 8 percent, about 6 to about 14 percent, about 6 to about 12 percent, about 6 to about 10 percent, about 8 to about 15 percent, about 8 to about 12 percent, about 10 to about 15 percent, or about 2, 3, 4, 5, 6, 7, 8, 9, 10, 11, 12, 13, 14 or 15 percent total solids. In another example, the concentrating step 140 may additionally or alternatively be through reverse osmosis and may result in a dairy-derived sodium phosphate and sodium citrate level of up to about 60 percent total solids, or up to about 55 percent, up to about 50 percent, up to about 45 percent, up to about 40 percent, up to about 35 percent, up to about 30 percent, up to about 25 percent total solids.

The concentrated sodium phosphate and sodium citrate may be provided as a dairy-derived emulsifying salt product, or it may optionally be combined with other food components to produce dairy products in step 150. For instance, these dairy-derived emulsifying salts may be added to downstream dairy components or other food components to produce dairy products or other food products. In some approaches, the concentrated dairy-derived emulsifying salts are added to dairy components produced from the same starting material 101 from which the emulsifying salts were produced, e.g., from the same dairy stream such as the same batch or volume passing through a continuous process. For instance, the retentate from the filtration step 110 may be used in combination with the concentrated sodium phosphate and sodium citrate to produce such dairy-containing products. Other food components that may be combined with the dairy-derived emulsifying salts of the present disclosure include but are not limited to: milk, skim milk, buttermilk, milk permeate, whey, whey permeate, salty whey, acid whey, acid whey permeate, mother liquor from lactose manufacture, grandmother liquor from lactose manufacture, dairy products such as cheese or cream, concentrated milk, fermented concentrated milk, and so on.

The downstream products containing the dairy-derived emulsifying salts of the present disclosure may be produced using a variety of approaches. For instance, returning to FIG. 1, the concentrated milk retentate produced from filtration step 110 may optionally be fermented in step 160. The optional fermentation step may involve the addition of cultures. In some implementations, optional fermentation step 160 may involve evaporation, e.g., heating to remove moisture. The fermented milk retentate combined with the dairy-derived emulsifying salts may result in a cheese product.

The cultured milk and the dairy-derived emulsifying salts produced from step 140 may each be derived from the starting material 101 and may optionally be recombined in a pasteurization step 170. Alternatively, the dairy-derived emulsifying salts may be derived from the starting material 101 and the cultured milk may be from a separate dairy stream may be combined in the pasteurization step 170. Following the pasteurization step 170, the dairy product may be cooled and packaged.

Due to the presence of the dairy-derived emulsifying salts, i.e., the phosphate and citrate native to the concentrated mineral-depleted dairy material, as well as any additional dairy components in the dairy product, the dairy product contains an amount of native phosphate and citrate sufficient to emulsify fat and hydrate protein in the dairy product. Consequently, the dairy-derived emulsifying salts facilitates in the production of a dairy product in which the composition, through its dairy-derived phosphate and citrate content, disrupts the dynamic equilibrium between bound and free calcium in the dairy component by binding free calcium in the environment, causing a redistribution of protein bound calcium out and into the unbound environment liberating protein to emulsify the milk fat within the dairy component; and raises the pH to cause de-protonation of acidic functional groups on casein, like aspartic and glutamic acid, to effectively hydrate the protein via solvated sodium ions exchange on the aspartic and glutamic acid residues on the protein from the sodium phosphate and sodium citrate, or otherwise solvated free sodium in the environment. This eliminates the need for the dairy product to include added emulsifying salts that are non-dairy-derived; and some dairy products of the present disclosure may be free of emulsifying salts that are non-dairy-derived.

The resulting dairy product contains dairy-derived emulsifying salts, which may account for all of the emulsifying salts in the product. Such products may include but are not limited to process cheese, process cheese products, creamers, stabilizers, flavored cheese powders, dairy bases such as for high protein puddings, or another dairy or food product. The dairy products may be produced with or without enzyme modifications.

Figure 2:
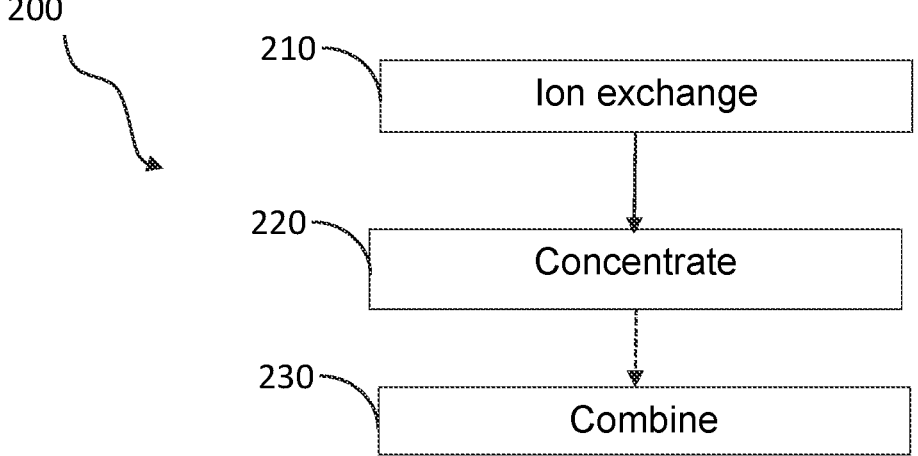
FIG. 2 illustrates a method for producing a de-calcified dairy product for incorporation into a dairy stream for the production of a process cheese product containing dairy-derived phosphate and citrate.

FIG. 2 illustrates a method 200 for producing a de-calcified dairy product for incorporation into a dairy stream for the production of a process cheese product containing dairy-derived phosphate and citrate. More particularly, the addition of a de-calcified dairy product to dairy components containing native phosphate and citrate increases a ratio of the phosphate and citrate naturally present in the dairy product relative to calcium to thereby enable the dairy-derived phosphate and citrate to emulsify fat and hydrate protein as described herein.

In method 200, a dairy by-product, such as mother liquor or grandmother liquor, dairy by-products also known as delactose permeate (DLP), is passed through an ion, e.g., cation, exchange column in step 210 to produce a de-calcified dairy by-product, e.g., de-calcified mother liquor, de-calcified grandmother liquor or de-calcified DLP. Mother liquor is a by-product liquid separated from the crystallized lactose during the manufacture of lactose, and grandmother liquor is derived as a secondary liquid by-product from a second lactose crystallization step of mother liquor. These mother liquors contain calcium, residual lactose, citrate, phosphate, other ash (e.g., minerals), vitamins (e.g., riboflavin), lactic acid, and non-protein nitrogen (NPN). In some implementations, the dairy by-product is derived from a starting material such as whey, milk permeate, or another mineral-rich dairy stream.

The de-calcified dairy by-product may be subjected to a concentration step 220. For instance, the de-calcified dairy by-product may be concentrated by evaporation, reverse osmosis, forward osmosis, or spray drying, or a combination of these processes, and may be subsequently used as a dairy-derived emulsifying salt to make a dairy product. The concentrated de-calcified dairy by-product may optionally be combined with dairy components to produce a dairy product in step 230. Due to the calcium-depleted nature of the dairy by-product, the native phosphate and citrate present in the dairy components are present at a higher ratio relative to calcium and thus serve to emulsify fat and hydrate protein as described herein.

The dairy-derived emulsifying salts of the present disclosure facilitate in the production of dairy products by adjusting a ratio of the emulsifying salts to calcium. The dairy-derived emulsifying salts disrupt the dynamic equilibrium between bound and free calcium in the dairy product by binding free calcium in the environment, causing a redistribution of protein bound calcium out and into the unbound environment liberating protein to emulsify the milk fat within the dairy product; and raises the pH to cause deprotonation of acidic functional groups on casein, like aspartic and glutamic acid, to effectively hydrate the protein via solvated sodium ions exchange on the aspartic and glutamic acid residues on the protein from the phosphate and citrate, or otherwise solvated free sodium in the environment.

In some implementations, the step of combining 230 may be followed by an optional pasteurization step 240 in order to produce the dairy product. For instance, the calcium-depleted dairy by-product may be mixed with a blend of natural cheese and dairy ingredients in a pasteurization step 240 to produce a dairy product such as process cheese containing the concentrated de-calcified by-product as method of reducing a ratio of calcium relative to the dairy phosphate and citrate naturally present in the other dairy components. Following the pasteurization step 240, the process cheese may be cooled, and packaged.

In further approaches, one or more of the dairy components used to produce the dairy product may be subjected to further processing to remove one or both of chloride and potassium, e.g., through NF and/or ion exchange, in order to produce the process cheese product. Such products may have an adjusted flavor profile adapted for use of the disclosed dairy-derived emulsifying salts.

As provided herein, a dairy phosphate and citrate source is derived from a dairy by-product stream by isolating the dairy phosphate and citrate present in the by-product stream; by significantly reducing the calcium in the by-product stream relative to the dairy phosphate and citrate naturally present in the same or different dairy by-product stream; or both. A dairy product may thus be manufactured by manipulating the phosphate+citrate-to-calcium ratio during the manufacturing process, either by isolating dairy phosphate and citrate directly and/or by reducing the calcium relative to the phosphate and citrate present in the dairy by-product stream. Using either approach, the dairy product, e.g., process cheese, may be produced using the same or similar modes of action, i.e., by the dairy citrate and phosphate emulsifying salts facilitating milk fat emulsification (and emulsification of other fats, e.g., vegetable fat) and hydrating protein during the manufacturing process of the dairy product.

In some implementations, calcium, dairy phosphate and/or citrate may be removed from the starting material 101 via ion exchange prior to further processing, e.g., prior to filtration, may be concentrated, and the product (e.g., calcium-depleted starting material or concentrated dairy phosphate and/or citrate) may be added back to a cheese blend ingredient or cheese to manufacture process cheese without added emulsifying salt chemicals.

In addition or alternatively, calcium, phosphate and/or citrate may be removed from reconstituted milk minerals using ion exchange or electrodialysis. Calcium-depleted milk may be used with other dairy components containing native phosphate and citrate to achieve the desired emulsifying effect from the dairy-derived phosphate and citrate. Alternatively, isolated phosphate and citrate from the milk may be provided as a dairy-derived emulsifying salt to produce the dairy product.

In addition or alternatively, chloride and calcium ions may be removed from mother liquor of lactose production via nanofiltration and ion exchange, respectively, and subsequently remove chloride via ion exchange from a sodium chloride solution and add the chlorine depleted sodium solution to the calcium depleted stream and crystallize out the dairy phosphate as sodium phosphate as another means to extract dairy phosphate for the emulsifying salts for dairy product manufacture.

The methods described herein may alternatively or further involve adjusting pH by the addition of one or more acids, such as an edible acid. Edible acids may include lactic acid, acetic acid and citric acid. In addition or alternatively, dairy production components such as salt, dairy powders, milk fat, enzymes, and cultures may be added. In addition or alternatively, the dairy products herein may be free of non-dairy-derived emulsifying salts or may contain such emulsifying salts in an amount that is insufficient to emulsify fat and hydrate protein in the dairy product.

Advantages of the present disclosure include but are not limited to increased value from a milk by-product stream by harvesting the dairy phosphate or citrate to replace chemical emulsifying salts, and to ultimately manufacture a cleaner label process cheese product not having to have sodium phosphate on the label, using more natural to the milk, dairy-based ingredient sources. The latter may improve the consumer perception of process cheese based on the simplified ingredient statement of the process cheese manufactured from this invention. Moreover, if steps are being taken to demineralize milk permeate for extracting dairy phosphate, a manufacturer would be that much closer to producing purified lactose from the permeate, potentially adding further value from the lactose side of the permeate. Further, demineralization of milk permeate may actually improve the efficiency of a lactose manufacturing process. Extracting the purified lactose component from permeate, leaves mother liquor which has limited commercial value, and can present acute disposal issues. Lastly, maintaining added phosphate in a cleaner label process cheese would maintain flavor, texture and performance characteristics of the process cheese compared to other cleaner label methods/ingredients where sodium phosphate chemicals would be removed from the process cheese formulation.

While the methods disclosed herein have been described and shown with reference to particular operations performed in a particular order, it will be understood that these operations may be combined, sub-divided, or re-ordered to form equivalent methods without departing from the teachings of the present disclosure. Accordingly, unless specifically indicated herein, the order and grouping of the operations should not be construed as limiting.

Similarly, it should be appreciated that in the foregoing description of example embodiments, various features are sometimes grouped together in a single embodiment, figure, or description thereof for the purpose of streamlining the disclosure and aiding in the understanding of one or more of the various aspects. These methods of disclosure, however, are not to be interpreted as reflecting an intention that the claims require more features than are expressly recited in each claim. Rather, as the following claims reflect, inventive aspects lie in less than all features of a single foregoing disclosed embodiment, and each embodiment described herein may contain more than one inventive feature.

While the present disclosure has been particularly shown and described with reference to embodiments thereof, it will be understood by those skilled in the art that various other changes in the form and details may be made without departing from the spirit and scope of the disclosure.

What is claimed is:

1. A method for producing a dairy product, the method comprising:

subjecting a starting dairy material to ion exchange with an eluting solution comprising one or both of sodium chloride and sodium hydroxide to remove calcium from the starting dairy material to produce a calcium-depleted dairy stream;

concentrating the calcium-depleted dairy stream; and combining the concentrated calcium-depleted dairy stream with dairy components produced from the starting dairy material to produce the dairy product, wherein the dairy product contains an amount of native phosphate and citrate from the starting dairy material sufficient to emulsify fat and hydrate protein in the dairy product.

2. The method of claim 1, wherein the starting dairy material comprises one or more of pasteurized milk, buttermilk, skim milk, milk permeate, whey, whey permeate, acid whey, acid whey permeate, or salty whey.

3. The method of claim 1, wherein the starting dairy material is milk.

4. The method of claim 1, wherein the dairy product is produced without the addition of non-dairy-derived emulsifying salts.

5. The method of claim 1, wherein the starting dairy material is produced from one or more of ultrafiltration (UF), microfiltration (MF) or nanofiltration (NF).

6. The method of claim 5, wherein the starting dairy material is a permeate produced from the one or more of the UF or MF.

7. The method of claim 6, wherein the starting dairy material is milk permeate.

8. The method of claim 5, wherein the dairy components added in the step of combining comprise a concentrated milk retentate or a component thereof produced from the one or more of the UF or MF.

9. The method of claim 1, wherein the concentrating comprises one or more of evaporative heating, spray drying, reverse osmosis, or forward osmosis.

10. The method of claim 1, wherein the method is a continuous process.

11. The method of claim 1, wherein subjecting a starting dairy material to ion exchange comprises subjecting the starting dairy material to anion exchange.

12. The method of claim 1, wherein the step of concentrating the calcium-depleted dairy stream results in a dairy-derived sodium phosphate and sodium citrate level that ranges from about 1 to about 15 percent total solids.

13. A method for producing a dairy product, the method comprising:

subjecting a starting dairy material to ion exchange with an eluting solution comprising one or both of sodium chloride and sodium hydroxide to remove calcium from the starting dairy material to produce a calcium-depleted dairy stream;

combining the calcium-depleted dairy stream with dairy components produced from the starting dairy material to produce the dairy product, wherein the dairy product contains an amount of native phosphate and citrate from the starting dairy material sufficient to emulsify fat and hydrate protein in the dairy product.

14. The method of claim 13, wherein the starting dairy material comprises one or more of pasteurized milk, buttermilk, skim milk, milk permeate, whey, whey permeate, acid whey, acid whey permeate, or salty whey.

15. The method of claim 13, wherein the dairy product is produced without the addition of non-dairy-derived emulsifying salts.

16. The method of claim 13, wherein the starting dairy material is produced from one or more of ultrafiltration (UF), microfiltration (MF) or nanofiltration (NF).

17. The method of claim 16, wherein the starting dairy material is a milk permeate produced from the one or more of the UF or MF.

18. The method of claim 16, wherein the dairy components added in the step of combining comprise a concentrated milk retentate or a component thereof produced from the one or more of the UF or MF.

19. The method of claim 13, wherein the method is a continuous process.

20. The method of claim 13, wherein subjecting a starting dairy material to ion exchange comprises subjecting the starting dairy material to anion exchange.

* * * * *